United States Patent
Dehondt

(10) Patent No.: US 7,520,214 B2
(45) Date of Patent: Apr. 21, 2009

(54) METHOD AND MACHINE FOR PACKING FIBROUS PLANTS INTO BALLS ESPECIALLY COMMON FLAX, HEMP PLANT AND SISAL

(76) Inventor: Guy Dehondt, 20, rue du Chateau, Aubergenville la Campagne (FR) 76170

( * ) Notice: Subject to any disclaimer, the term of this patent is extended or adjusted under 35 U.S.C. 154(b) by 289 days.

(21) Appl. No.: 10/590,468

(22) PCT Filed: Feb. 23, 2005

(86) PCT No.: PCT/FR2005/000424

§ 371 (c)(1), (2), (4) Date: Aug. 23, 2006

(87) PCT Pub. No.: WO2005/082175

PCT Pub. Date: Sep. 9, 2005

(65) Prior Publication Data

US 2007/0175197 A1   Aug. 2, 2007

(30) Foreign Application Priority Data

Feb. 23, 2004 (FR) .................... 04 01757
Sep. 24, 2004 (FR) .................... 04 10125

(51) Int. Cl.
*A01D 37/00* (2006.01)
*A01D 45/06* (2006.01)

(52) U.S. Cl. .............. 100/3; 100/35; 100/161; 100/168; 100/176; 56/131; 56/192

(58) Field of Classification Search ............ 100/1, 100/2, 6, 7, 8, 3, 35, 155 R, 161, 163 R, 164, 100/168, 176; 19/5 R, 6; 56/132, 131, 192
See application file for complete search history.

(56) References Cited

U.S. PATENT DOCUMENTS

| 2,391,977 A * | 1/1946 | Johansen .................. 19/9 |
| 2,443,296 A | 6/1948 | Brereton |
| 2,652,598 A * | 9/1953 | U Ren ...................... 19/12 |
| 6,539,585 B1 * | 4/2003 | Anthony ................... 19/48 R |

FOREIGN PATENT DOCUMENTS

| DE | 342442 | 10/1921 |
| FR | 1.322.981 | 4/1963 |
| FR | 2810997 A1 * | 1/2002 |

* cited by examiner

*Primary Examiner*—Jimmy T Nguyen
(74) *Attorney, Agent, or Firm*—Gerald E. Hespos; Anthony J. Caseila

(57) ABSTRACT

A method is provided for collecting at least partially retted plants and winding them into bales. The method is characterised in that the collected and wound plants are fibrous plants with previously cut tops and bottoms. A machine to perform the method has a gatherer (3) for collecting at least partially retted plants with previously cut tops and bottoms, a crusher (4) for grinding the stems of the plants without tops and bottoms to break the wood filaments therein, a decorticator (10) for scarifying the ground stems to release the wood filaments and shives, a unit (31) for laying flat the fibres scutched in this way, and a baler (32) for winding the same into bales.

13 Claims, 3 Drawing Sheets

METHOD AND MACHINE FOR PACKING FIBROUS PLANTS INTO BALLS ESPECIALLY COMMON FLAX, HEMP PLANT AND SISAL

BACKGROUND OF THE INVENTION

1. Field of the Invention

The present invention relates to a method for baling fibrous plants, especially flax, hemp or sisal, said plants being arranged in windrows on the soil and at least partly retted, which method comprises the steps consisting in gathering and rolling up the at least partly retted plants.

2. Description of the Related Art

Long-fiber fibrous plants, such as textile flax, are baled after being retted on the soil, and then transferred to conversion sites where they are subjected to conventional scutching and combing operations.

Currently the plants are rolled while they are whole, and therefore comprise their tops and bottoms.

However, current procedures for treating long-fiber plants are not completely satisfactory. This is because they require many handling operations to be carried out between the baling and the operations performed on the conversion sites.

They also suffer a not inconsiderable loss of grain, this loss being due to parasites appearing during retting on the soil or resulting from many handling operations that precede the scotching and combing.

SUMMARY OF THE INVENTION

The object of the present invention is to provide a solution to the abovementioned problems and, to do so, the subject of the invention is a method for baling fibrous plants, especially flax, hemp or sisal, which plants are windrowed on the soil and at least partly retted, this method comprising the steps consisting in gathering and rolling up the at least partly retted plants, and being characterized in that the gathering and rolling-up steps are carried out on fibrous plants whose tops and bottoms have been cut off beforehand.

The fibrous plants that have been baled by the implementation of the method according to the invention can now be scutched and combed more easily and more quickly than conventionally baled plants.

This is because the scutching and combing operations may be carried out independently of the operations for treating the tops and bottoms on other sites and at other times.

Preferably, the baling method according to the invention comprises, after the gathering step and before the rolling-up step, the steps consisting in crushing the gathered stalks so as to break up the wood filaments that they contain, in decorticating the crushed stalks, so as to strip them of the wood filament fragments and shives, and in laying the thus scutched fibers out flat.

After these steps have been carried out, the stalks of the baled fibrous plants may be sent to the conversion sites, having undergone a prescutching step.

The scutching and combing operations to be carried out subsequently on the conversion sites may therefore be carried out more easily, more quickly and less expensively than at the present time.

During implementation of the baling method according to the invention, the crushing step may advantageously consist in passing the stalks between at least one set of two parallel rollers capable of rotating in opposite directions and including splines at least partly imbricated in one another, the stalks being parallel to the rollers as they pass between them.

The decorticating step itself may advantageously be carried out in two successive phases, during each of which the stalks are decorticated over one half of their periphery.

The method according to the invention may also include an additional step consisting in collecting the wood filament fragments and the shives so that they can be recycled and used in industry.

The present invention also relates to a machine for baling fibrous plants, especially flax, hemp or sisal, which plants are windrowed on the soil and at least partly retted, this machine being characterized in that it comprises means for gathering the at least partly retted plants, the tops and bottoms of which have been cut off beforehand, means for crushing the stalks of the plants without top and bottom so as to break up the wood filaments that they contain, means for decorticating the crushed stalks, so as to strip them of the wood filament fragments and shives, means for laying the thus scutched fibers out flat, and means for rolling up the latter in the form of bales.

The machine according to the invention thus prescutches the stalks of the fibrous plants before they are baled, and consequently makes it possible to simplify and speed up the treatment procedures on the conversion sites.

Advantageously, the crushing means may comprise at least one group of two parallel rollers arranged one on top of another, which are capable of rotating in opposite directions and include splines at least partly imbricated in one another, the stalks being crushed by passing between the rollers, parallel to the latter.

The decorticating means themselves may comprise two decorticator units, each decorticating over one half of the periphery of the stalks.

Preferably, each decorticator unit comprises two drums extending parallel to the path of the stalks to be decorticated and each defining a corridor of constant width with a separator element located between them, the drums each having longitudinal slats on their lateral surface and being capable of rotating in opposite directions in order for their slats to move along substantially one half of the length of the stalks, while applying the latter against the two longitudinal flanks of the separator element.

To ensure uniform decorticating over all the stalks of the plants, it is desirable for the longitudinal slats of the drums to be placed radially and at an equal distance from one another, and to have a height practically equal to the width of the corridors.

Moreover, to preserve the fibers of the stalks as far as possible, the slats are preferably made of a flexible material especially leather or wood.

The machine according to the invention may furthermore include means for recovering the wood filament fragments and the shives for the purpose of recycling them in industry.

Particularly advantageously, the machine according to the invention may include a driver cabin located at the front and in the central part.

Thus, the driver may have a perfect view of the space lying in front of him and near each of the longitudinal sides of the machine.

The central arrangement of the cabin may advantageously be exploited in order to equip the machine with two baling units placed on either side of its longitudinal axis, each unit comprising gathering means, crushing means, decorticating means, laying-out-flat means and rolling-up means.

The hourly efficiency of this machine may thus be excellent and consequently the cost of baling is appreciably reduced.

BRIEF DESCRIPTION OF THE DRAWINGS

One embodiment of the present invention will be described below by way of entirely nonlimiting example, with reference to the appended drawings in which.

DETAILED DESCRIPTION OF THE PREFERRED EMBODIMENT

Figure 1:
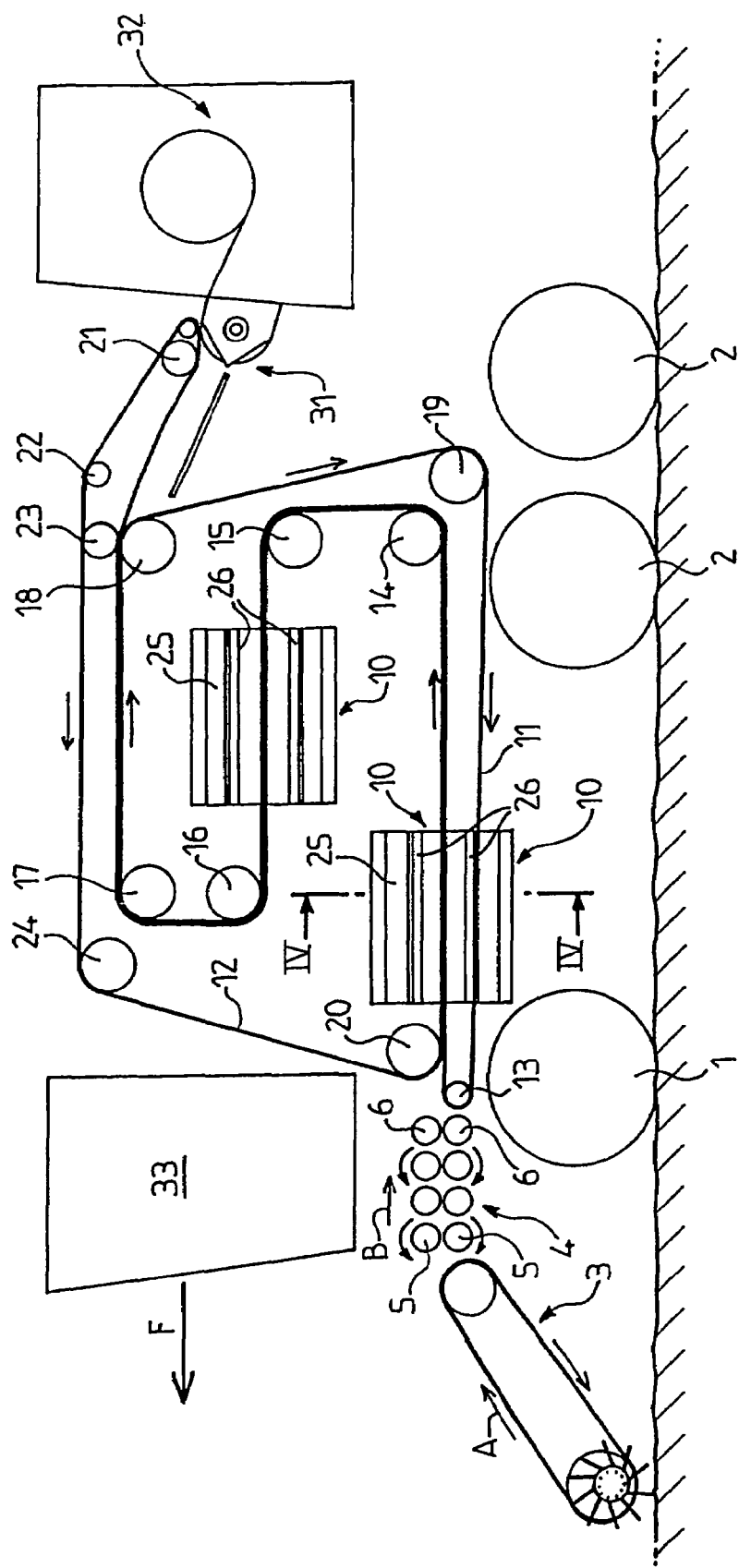
FIG. 1 is a schematic side view of a baling machine according to the invention, the frame of this machine not being shown for the sake of simplification.

The machine shown schematically in the drawings was developed for baling the textile flax plants arranged in windrows on the soil.

However, it goes without saying that the machine could be used for baling other fibrous plants, for example hemp or sisal.

The machine that can be seen in the drawings runs on front wheels 1 and rear wheels 2, and moves in the direction indicated by the arrow F when it is used to gather and bale the fibrous plants.

It should be noted here that the tops and bottoms of the plants have been cut off before windrowing, so as to facilitate and speed up the retting thereof.

The machine according to the invention has been adapted specifically for baling the stalks remaining after cutting off the tops and bottoms of the textile flax plants.

The machine firstly comprises gathering means 3 located at its front part, these means being placed symmetrically with respect to its longitudinal axis and having a conventional structure, which it is unnecessary to describe here.

It will simply be indicated that the means 3 are designed for simultaneously gathering two windrows and moving them in the direction of the arrow A so as to direct them into the machine.

The machine also includes crushing means 4 located immediately after the gathering means 3 and designed to break up the wood filaments contained in the plant stalks constituting the windrows.

Figure 2:
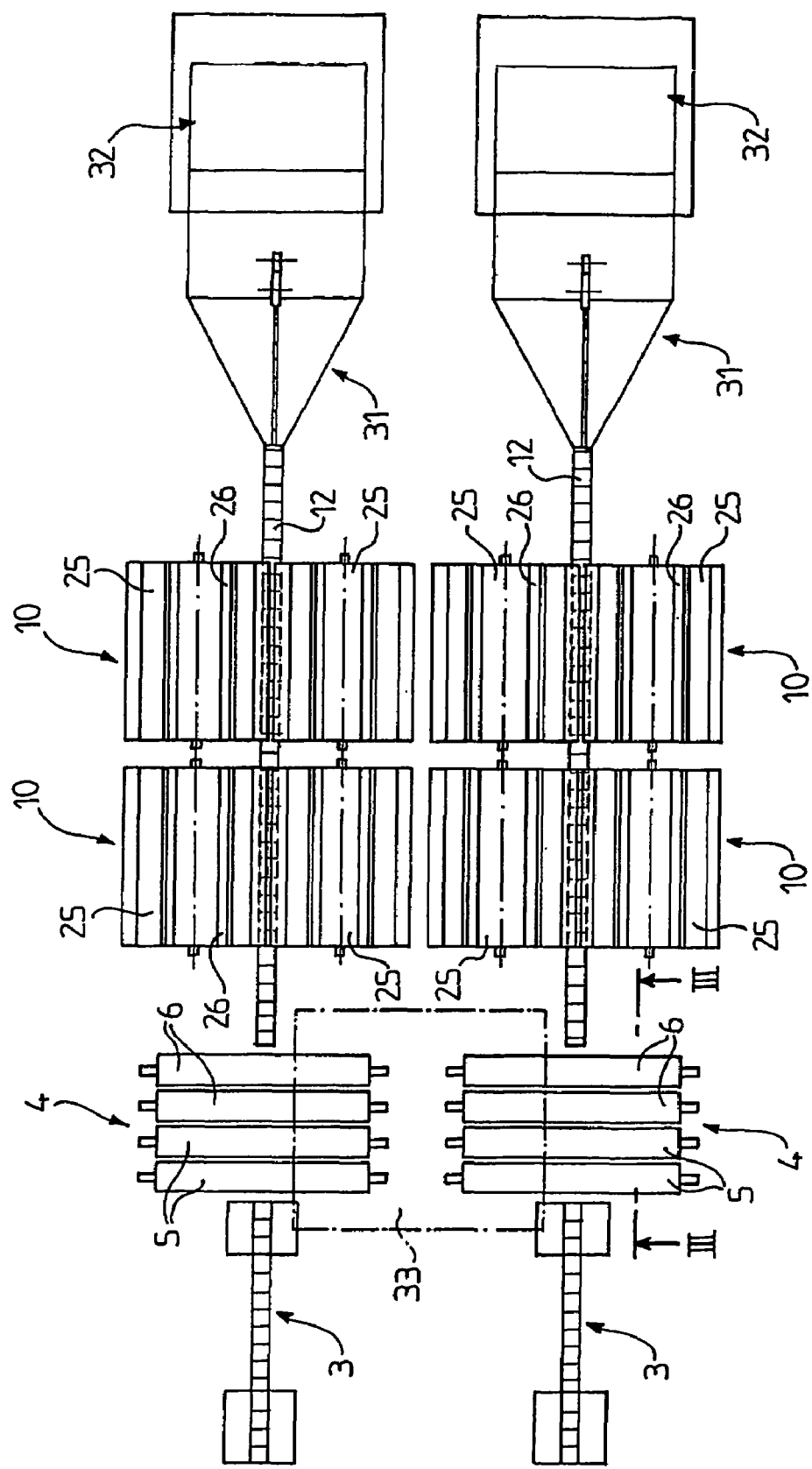
FIG. 2 is a schematic top view of the machine visible in FIG. 1.

In the embodiment shown in FIGS. 1 and 2, the crushing means 4 are distributed in two identical units placed symmetrically relative to the longitudinal axis of the machine and each intended to crush the wood filaments of the stalks making up the same windrow.

Each crushing unit comprises four groups of two rollers 5, 6 placed parallel one above the other and intended to rotate in opposite directions under the control of conventional drive members (not shown).

The four groups of two rollers of each unit are placed, one after the other, at the same height, where as the directions of rotation of their respective rollers are chosen so that they drive in the direction of the arrow B, the plant stalks reaching the rear end of the corresponding gathering means 3.

Figure 3:
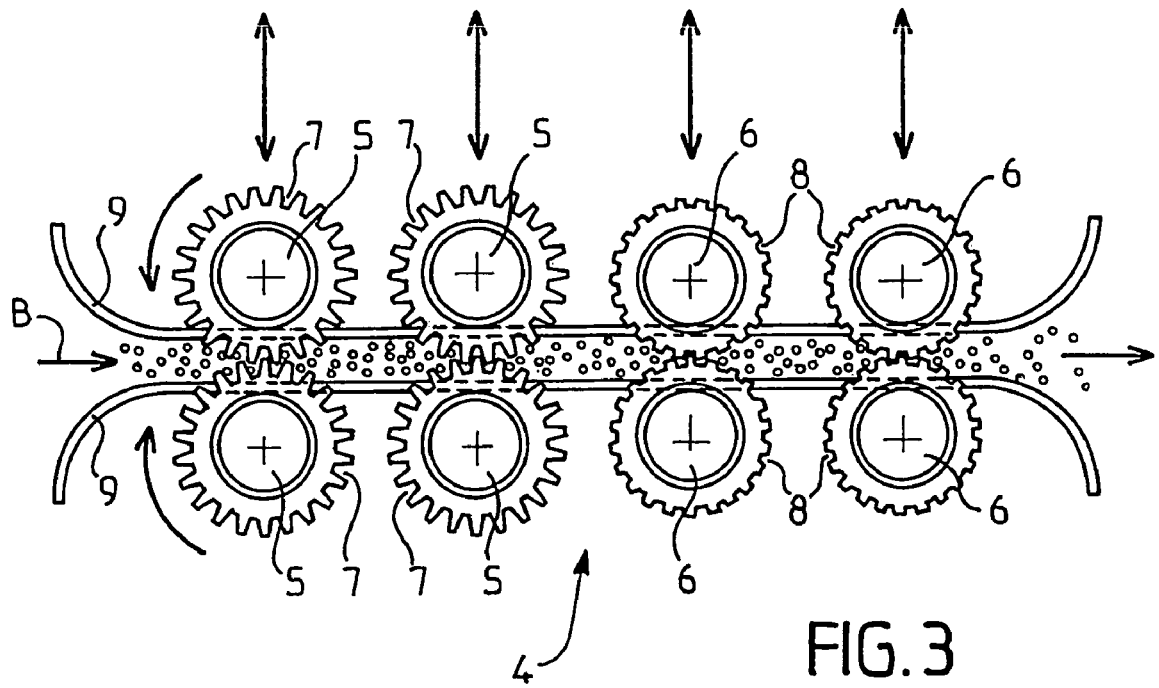
FIG. 3 is a schematic side view on an enlarged scale of the crushing means of the machine.

FIG. 3 shows that the two first groups of rollers each have two rollers 5 provided with longitudinal splines 7, where as the last two groups each comprise two rollers 6 provided with longitudinal splines 8, the rollers 6 having a slightly smaller diameter than that of the rollers 5 and splines 8 shallower than the splines 7.

It should also be noted that the splines of the associated rollers are imbricated in each other, their imbrication being designed to break up the wood filaments contained in the stalks as they move in the direction of the arrow B.

Of course, the rollers of the two crushing units could be identical without thereby departing from the scope of the present invention.

In the embodiment envisaged here, the height of the upper rollers 5, 6 can be regulated under the control of conventional members (not shown) so as to adjust the degree of imbrication of their splines with those of the lower rollers 5, 6 and to optimally crush the wood filaments contained in the stalks.

Moreover, the stalks traveling through the crushing units are guided by two walls 9 located facing each other so as to provide a flow corridor and thus prevent dispersion of the stalks in the surrounding space.

Upon leaving each of the crushing units, the stalks are driven toward a first decorticator unit 10 via two belts 11, 12, more particularly visible in FIG. 1.

This figure shows that the belt 11 passes in succession over:
a pulley 13 located near the lower roller of the last group of rollers of the corresponding crushing unit;
a pulley 14 located at the rear of the machine, at a greater height than that of the pulley 13 in order for the belt run extending between these pulleys to be horizontal;
a pulley 15 located above the pulley 14;
a pulley 16 located at the front of the machine, at a greater height than that of the pulley 15 so that the belt run extending between these two pulleys is horizontal;
a pulley 17 located above the pulley 16;
a pulley 18 located at the rear of the machine, practically above the pulleys 15 and 16; and
a pulley 19 located behind the pulley 14 at a lower height than that of the latter.

FIG. 1 also shows that the belt 12 passes in succession over:
a pulley 20 located at the front of the machine, at the same height as the pulley 14 and slightly behind the pulley 13;
the pulleys 14 to 18;
a pulley 21 located behind the pulley 18 and at a lower height;
a pulley 22 located between the pulleys 18 and 21, but at a greater height;
a pulley 23 located above the pulley 18; and
a pulley 24 located ahead of the pulley 17, at a greater height than that of the latter.

Thanks to this particular arrangement, the belts 11 and 12 are in contact with each other over that part of their length going from the pulley 20 to the pulley 18, passing via the pulleys 14 to 17.

It should be pointed out here that the belts 11 and 12 are driven in the direction of the arrows (having no reference number in FIG. 1) via conventional driving members (not shown).

When the stalks emerge from a crushing unit, the corresponding belt 11 drives them toward the first decorticator unit 10, firstly alone over the distance going from the pulley 13 to the pulley 20, and then in cooperation with the belt 12 over the distance going from this pulley to the decorticator unit 10.

As they move from one of the crushing units to the associated decorticator unit, the stalks are driven by the belts 11 and 12 while being supported only in their central part, and they consequently adopt an upside-down U configuration.

Figure 4:
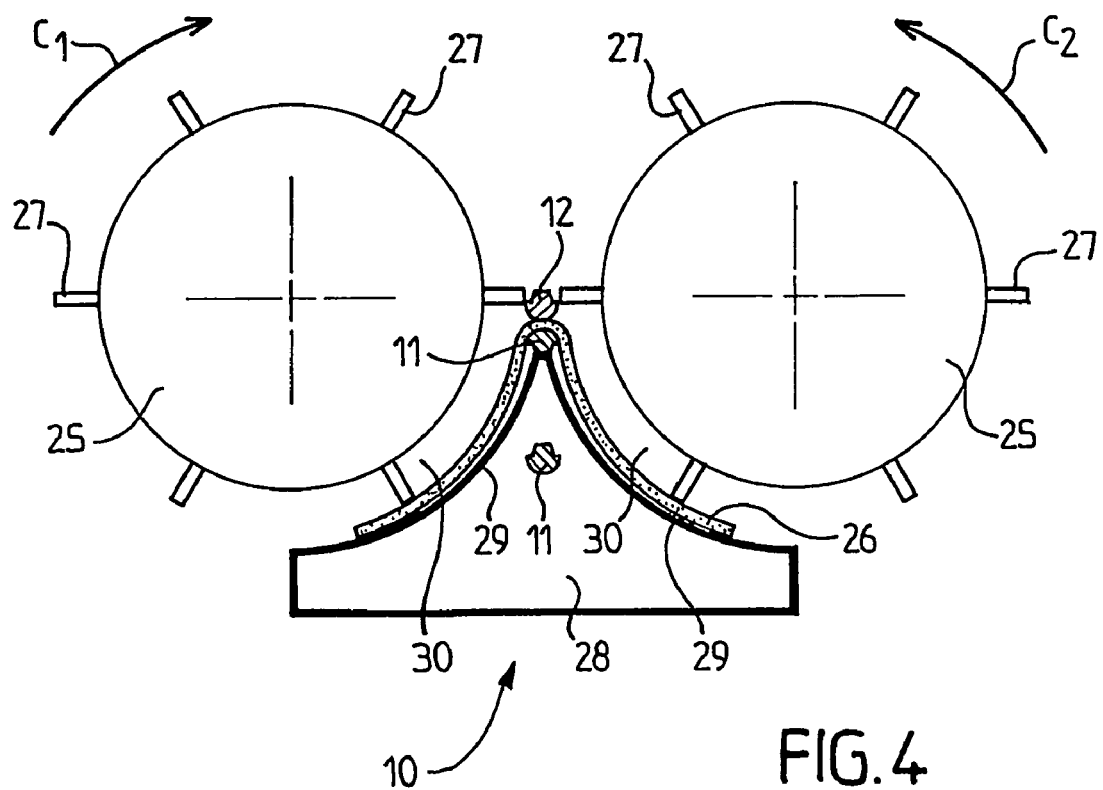
FIG. 4 is a schematic sectional view on an enlarged scale on the line IV-IV of FIG. 1.

Referring now to FIG. 4, which shows the structure of a decorticator unit 10, it may be seen that the latter comprises two drums 25 extending parallel to the path of the stalks 26 to be decorticated and each provided with longitudinal slats 27 placed radially and at equal distances from one another, and also a separator element 28 located between the two drums and comprising two longitudinal flanks 29 defining with each of these drums, a corridor 30 of constant width.

It may also be seen that the runs of the belts 11 and 12 that drive the stalks 26 are located just above the highest part of the upper face of the separator element 28.

The two drums 25 are mounted so as to rotate in opposite directions under the control of driving members (not shown), in the directions indicated by the arrows $C_1$, $C_2$ in FIG. 4, so that their longitudinal slats 27 move along substantially one half of the length of the stalks 26, while pressing the latter against the two flanks 29 of the separator element 28.

Thus, the slats 27 decorticate the stalks 26 over approximately one half of their periphery so as to strip them of a first part of the wood filament fragments and shives.

On leaving the first decorticator unit, the plant stalks are pinched, in their central part, by the belts 11, 12, which drive them to a second decorticator unit 10 identical to the first.

The second decorticator unit 10 is located between the pulleys 15 and 16, through which the belts 11 and 12 pass, exactly as in the first decorticator unit.

However, since the belts turn the stalks over through 180° when they travel from the pulley 14 to the pulley 15, the longitudinal slats of the two drums of the second decorticator unit also move along substantially one half of the length of the stalks 26, but over the second half of the periphery thereof.

Thus, the second decorticator unit strips the stalks of the wood filament fragments and shives that were not removed by the first decorticator unit.

The machine also comprises conventional means 31 provided immediately after the pulley 21, which are intended to lay out flat the stalks scutched by the two decorticator units 10, and also conventional means 32 placed after the means 31, which are intended to wind up the stalks in the form of bales.

It should be noted here that the machine includes a driver cabin 33 located at the front and in a central position so as to offer the driver a perfect view over the windrows to be gathered, and also over the longitudinal sides of the machine.

To be complete, it should be pointed out that the machine that has just been described may advantageously include means (not shown) for collecting the wood filament fragments and the shives, so that this waste can be recycled in industry.

The invention claimed is:

1. A method for baling fibrous plants, of flax, hemp or sisal, comprising the steps, in succession, of: cutting off bottoms of the plants, placing the plants without the bottoms in windrows on the soil, letting the plants be at least partly retted, gathering the plants and rolling the plants up, characterized in that the method further comprises cutting off tops of the plants before the plants are windrowed.

2. The method according to claim 1, characterized in that it comprises, after the gathering step and before the rolling-up step, the steps of crushing stalks of the plants without the tops and bottoms so as to break up wood filaments that the stalks contain, decorticating the crushed stalks so as to strip the stalks of wood filament fragments and shives while retaining scutched fibers, and laying the scutched fibers out flat.

3. The method according to claim 2, characterized in that the crushing step comprises passing the stalks of the plants without tops and bottoms between at least one set of two parallel rollers capable of rotating in opposite directions and including splines at least partly imbricated in one another, the stalks being parallel to the rollers as they pass between the rollers.

4. The method according to claim 2, characterized in that the decorticating step is carried out in two successive phases, during each of which the stalks of the plants without tops and bottoms are decorticated over one half of their periphery.

5. The method according to 2, characterized in that the method further includes a step of recovering the wood filament fragments and the shives.

6. A machine for baling fibrous plants, of flax, hemp or sisal, which are placed in windrows on the soil and at least partly retted, comprising means (3) for gathering the plants, means (4) for crushing stalks of the plants without bottoms so as to break up wood filaments that the stalks contain, means (10) for decorticating the crushed stalks so as to strip the crushed stalks of the wood filament fragments and shives while retaining scutched fibers, means (31) for laying the scutched fibers out flat, means (32) for rolling up the scutched fibers in the form of bales, and two walls (9) located facing each other so as to provide a flow corridor to guide the stalks traveling through the crushing means to prevent dispersion of the stalks in the surrounding space, characterized in that the crushing means (4) comprises at least one group of two parallel rollers (5; 6) placed one above the other and capable of rotating in opposite directions, each of the rollers having longitudinal splines (7; 8), the splines of the associated rollers are at least imbricated in one another, the rollers being positioned so that the stalks to be crushed pass between the rollers and the stalks are parallel to a rotational axis of each of the rollers.

7. The machine according to claim 6, characterized in that the decorticating means (10) comprise two decorticator units for decorticating over one half of the periphery the stalks without the tops and bottoms.

8. The machine according to claim 7, characterized in that each decorticator unit (10) comprises two drums (25) extending parallel to the path of the stalks (26) to be decorticated and a separator element (28) located at least partly between the drums (25), corridors (30) of constant width being defined between the separator element (28) and the respective drums (25), the drums each having longitudinal slats (27) on their lateral surface and being capable of rotating in opposite directions in order for the slats to move along substantially one half of a length of the stalks, while applying the stalks against two longitudinal flanks (29) of the separator element.

9. The machine according to claim 8, characterized in that the longitudinal slats (27) of the drums (25) are placed radially and at equal distances from one another, and have a height practically equal to the width of the corridors (30).

10. The machine according to claim 8, characterized in that the slats (27) are made of a flexible material.

11. The machine according to claim 6, characterized in that the machine further includes means for recovering the wood filament fragments and the shives.

12. The machine according to claim 6, characterized in that the machine further includes a driver cabin (33) located at a front and in a central part.

13. The machine according to claim 12, characterized in that the machine includes two baling units placed on either side of a longitudinal axis of the machine, each of the baling units comprising the gathering means (3), the crushing means (4), the decorticating means (10), the laying-out-flat means (31) and the rolling-up means (32).

* * * * *